United States Patent
Souk

(10) Patent No.: US 11,300,207 B2
(45) Date of Patent: Apr. 12, 2022

(54) SEAL MEMBER AND ROBOT

(71) Applicant: FANUC CORPORATION, Yamanashi (JP)

(72) Inventor: Hyunchul Souk, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 108 days.

(21) Appl. No.: 16/826,596

(22) Filed: Mar. 23, 2020

(65) Prior Publication Data
US 2020/0370652 A1  Nov. 26, 2020

(30) Foreign Application Priority Data

May 22, 2019  (JP) .............................. JP2019-095970

(51) Int. Cl.
*F16J 15/3204* (2016.01)
*B25J 9/00* (2006.01)
*B25J 19/00* (2006.01)

(52) U.S. Cl.
CPC ......... *F16J 15/3204* (2013.01); *B25J 9/0015* (2013.01); *B25J 19/0075* (2013.01)

(58) Field of Classification Search
CPC .... F16J 15/00; F16J 15/16; F16J 15/50; F16J 15/52; F16J 15/32; F16J 15/3204; F16J 15/3206; F16J 15/3212; B25J 19/0015; B25J 19/0075

USPC ......................................................... 277/553
See application file for complete search history.

(56) References Cited

U.S. PATENT DOCUMENTS

| | | | | |
|---|---|---|---|---|
| 6,367,810 B1 * | 4/2002 | Hatch | ................. | F16J 15/3224 277/551 |
| 6,367,811 B1 * | 4/2002 | Hosokawa | ........... | F16J 15/3232 277/560 |
| 6,565,096 B2 * | 5/2003 | Ikeda | ................... | F16J 15/3216 277/551 |

FOREIGN PATENT DOCUMENTS

| | | |
|---|---|---|
| JP | 2003-120697 A | 4/2003 |
| JP | 4114711 B2 | 7/2008 |
| JP | 2012-122534 A | 6/2012 |

* cited by examiner

*Primary Examiner* — Nathan Cumar
(74) *Attorney, Agent, or Firm* — Maier & Maier, PLLC

(57) ABSTRACT

A seal member interposed between a first member and a second member. The seal member includes a seal main body attached to one of the first member and the second member, and a protection cover attached to the seal main body, and the seal main body has a seal lip having contact with or close to the other one of the first member and the second member, a bent portion formed on one end of the metal ring of the seal main body is in contact with an outer-periphery portion of the protection cover, and the seal main body is in contact with a part of the protection cover in the axial direction, and the part is located at a position different from the outer-periphery portion.

8 Claims, 8 Drawing Sheets

OTHER SIDE IN AXIAL DIRECTION ⬅➡ ONE SIDE IN AXIAL DIRECTION

OTHER SIDE
IN AXIAL DIRECTION ⟷ ONE SIDE
IN AXIAL DIRECTION

SEAL MEMBER AND ROBOT

CROSS-REFERENCE TO RELATED APPLICATIONS

This application is based on and claims priority to Japanese Patent Application No. 2019-095970 filed on May 22, 2019, the entire content of which is incorporated herein by reference.

FIELD

This invention relates to a seal member and a robot.

BACKGROUND

Conventionally, there is a case where a seal member, is used at a part which is washed with high pressure liquid, has a protection cover which is attached to a housing or a shaft. Also, in order to attach the protection cover to an oil seal itself, there is a known technique, in which an end portion of a metal ring of the oil seal is bent radially inward after the end portion of the metal ring is once bent radially outward, and the protection cover is fixed to the oil seal by using this bent portion. This kind of oil seal is disclosed in Japanese Unexamined Patent Application, Publication No. 2012-122534, for example.

SUMMARY

An aspect of the present invention is a seal member which is interposed between a first member as a rotatable body, and a second member having an inner periphery surface opposing to an outer-periphery surface of the first member including: a seal main body which is attached to one of the first member and the second member; and, a protection cover which is attached to the seal main body, wherein, the seal main body includes a seal lip which comes into contact with or which is close to the other one of the first member and the second member, a bent portion formed on one end, in an axial direction, of a metal ring of the seal main body is in contact with an outer-periphery portion of the protection cover in an axial direction of the seal main body, and the seal main body is in contact with a part of the protection cover in the axial direction, and the part is located at a position different from the outer-periphery portion in a radial direction.

DESCRIPTION OF EMBODIMENTS

Figure 1:
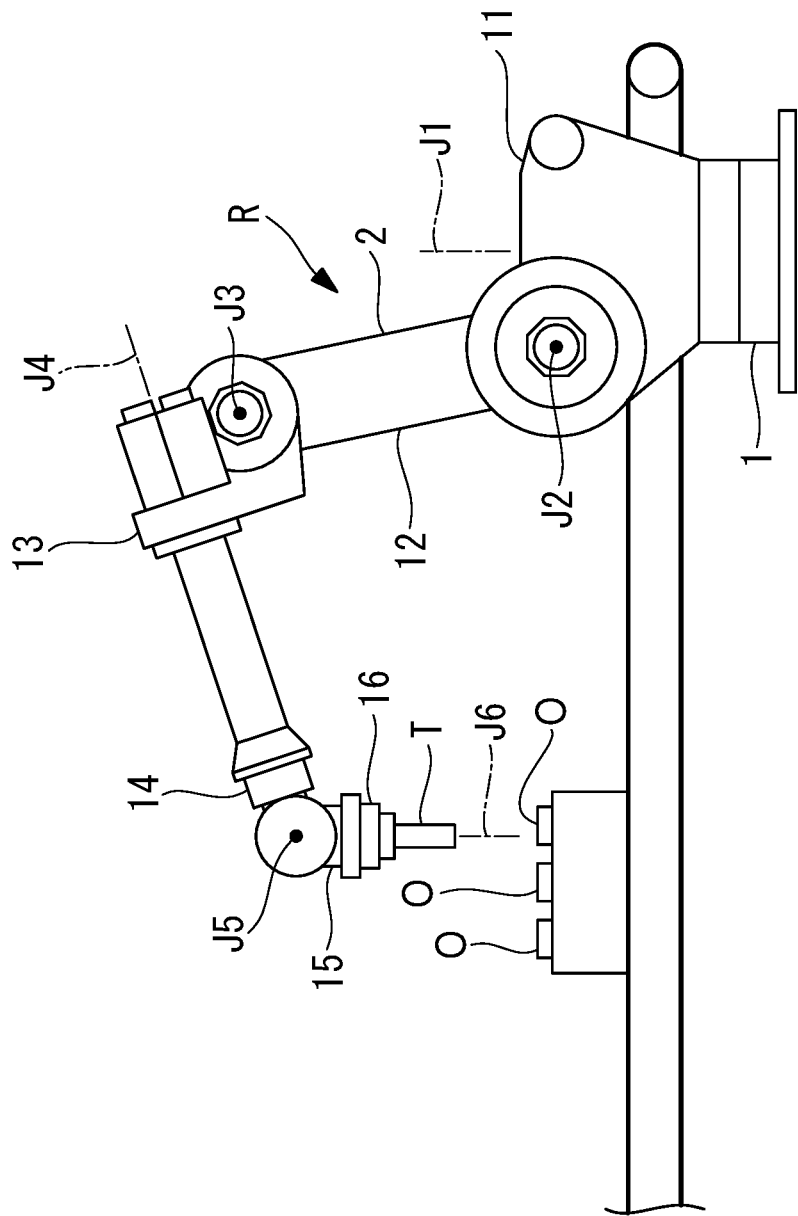
FIG. 1 is a schematic front view of a robot system using a robot according to a first embodiment of the present invention.

A seal member 20 and a robot R having the seal member 20 according to a first embodiment will be described below with reference to the accompanying drawings. The seal member 20 of this embodiment is used for a vertical articulated robot R which is shown in FIG. 1, for example. The seal member 20 of this embodiment may be used for other types of robots, such as a horizontal articulated robot, a parallel link robot, and the like.

As shown in FIG. 1, the robot R according to this embodiment has a base portion 1 and an arm portion 2, and any tool T can be attached at a distal end portion of the arm portion 2. In this embodiment, the tool T holds an object O, such as food, medical supplies, and the like, and the object O which is held is moved to a predetermined position by the robot R. Also, in order to keep the robot R in a hygienically appropriate state, the robot R is washed with high pressure liquid.

For that reason, there is a case where the robot R is required to have waterproof and dust-proof function so as to comply with IP69K and the like which is defined in the German Industrial Standard DIN 40050 PART 9. The waterproof function which is required by the IP69K is waterproof function at the time of discharging hot water at 80 degree Celsius with a water pressure of 80 to 100 bar from a distance of 10 to 15 cm away from a flat jet nozzle having a specified shape, and the like.

As shown in FIG. 1, the arm portion 2 has a first arm member 11 which is supported by a base portion 1, which is fixed to a predetermined installation surface, so as to be rotatable around a first axis line J1 which extends in an up and down direction. The arm portion 2 has a second arm member 12 whose proximal end side is supported by the first arm member 11 so as to be swingable around a second axis line J2 which extends in a horizontal direction, and a third arm member 13 whose proximal end side is supported by a distal end side of the second arm member 12 so as to be swingable around a third axis line J3 which extends in a horizontal direction.

Also, the arm portion 2 includes a forth arm member 14 which is supported by the third arm member 13 so as to be rotatable around a fourth axis line J4 which extends in a longitudinal direction of the third arm member 13, a fifth arm member 15 which is supported by the fourth arm member 14 so as to be swingable around a fifth axis line J5 which extends in a direction orthogonal to the fourth axis line J4, and a sixth arm member 16 which is supported by the fifth arm member 15 so as to be rotatable around a sixth axis line J6.

Also, the arm portion 2 includes a plurality of servo motors which respectively drive the first to the sixth arm members 11 to 16. Various types of servomotors, such as rotation motors and linear motors, can be used as each of the servomotors. Note that, the robot R of this embodiment is a six-axis articulated robot, however, the robot R may be an articulated robot having more than six joints or less than six joints.

Figure 2:
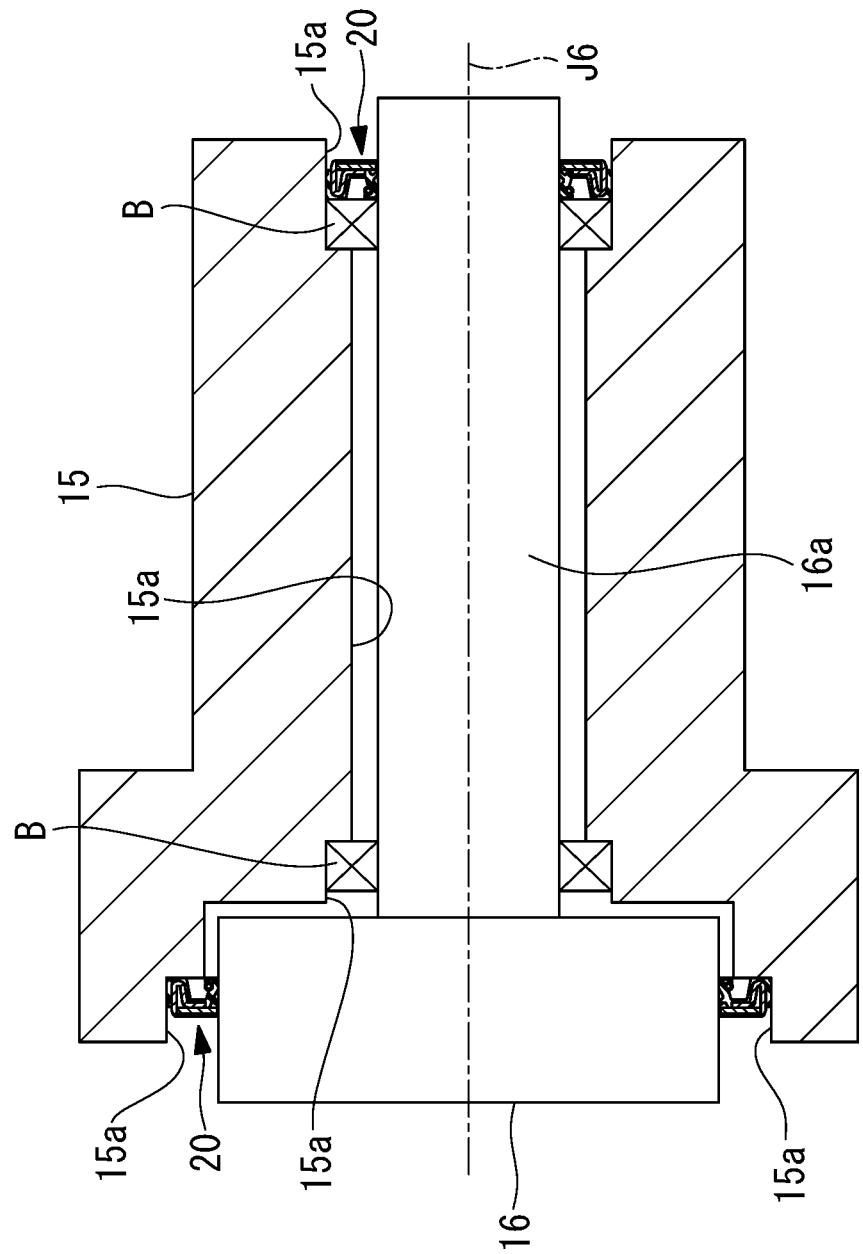
FIG. 2 is a schematic view of a fifth arm member and a sixth arm member of the robot of this embodiment.

FIG. 2 shows a schematic view of the fifth arm member 15 and the sixth arm member 16. As shown in FIG. 2, a shaft (a first member) 16a of the sixth arm member 16 is a rotatable body which is rotatably supported by the fifth arm member by means of a pair of bearings B, for example. The shaft 16a rotates with respect to the fifth arm member 15 by the servo motors. An outer-periphery surface of the shaft 16a of the sixth arm member 16 is arranged to face inner periphery surface 15a of the fifth arm member 15.

The shaft 16a has a cylindrical shape or a circular column shape. In an axial direction of the shaft 16a, the seal member 20 is attached to an outside relative to one of the bearings B in an inner periphery surface 15a of the fifth arm member (a second member) 15. In the axial direction of the shaft 16a, the seal member 20 is also attached to an outside relative to the other one of the bearings B in the inner periphery surface 15a of the fifth arm member 15. The two seal members 20 are different in size, however, they have the same configuration, and therefore, the two seal members 20 will be described below by using the same reference signs.

Figure 3:
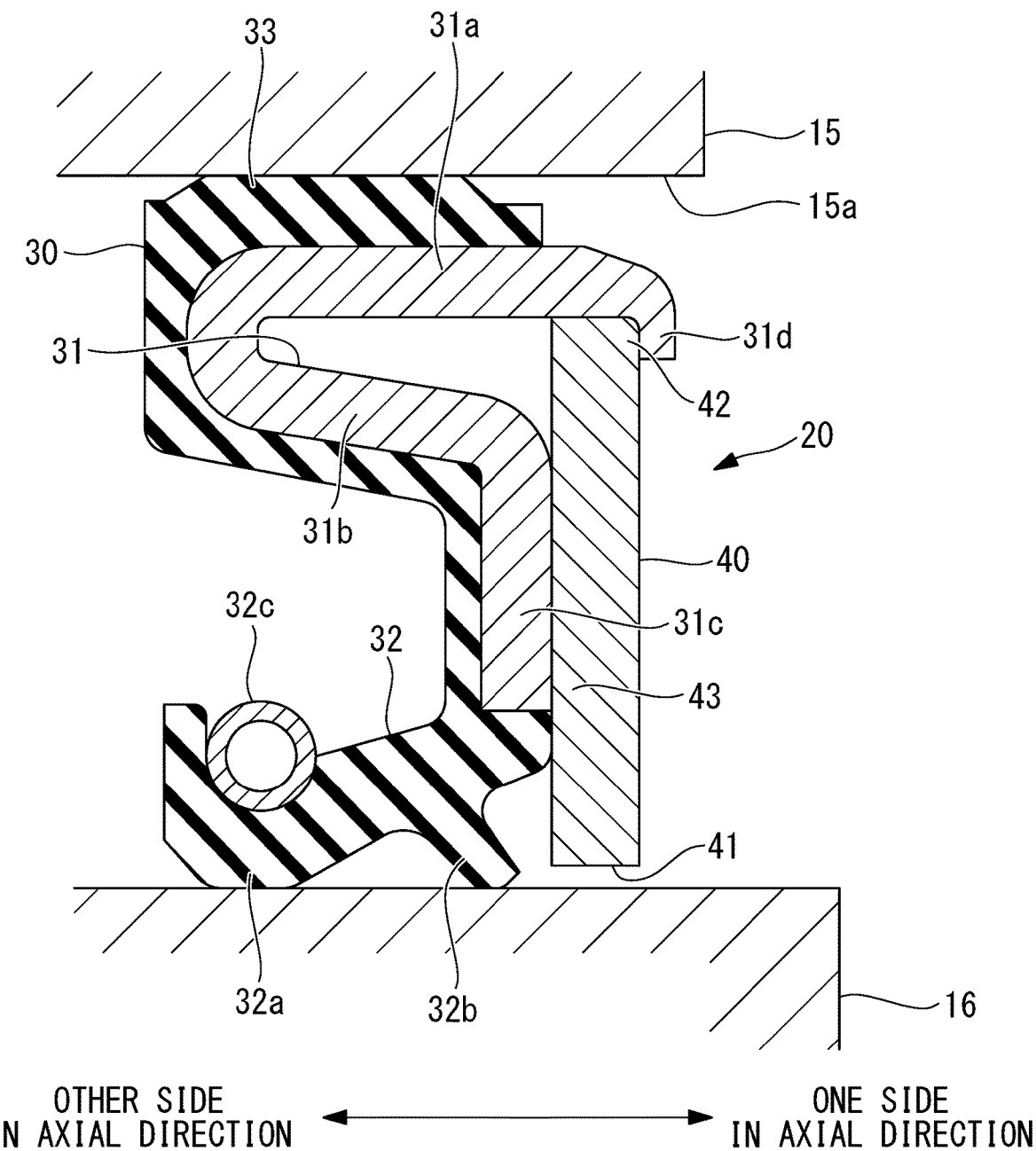
FIG. 3 is a sectional view of a seal member which is used in the robot of this embodiment.

Space which is formed between the fifth arm member 15 and the outer-periphery surface of the shaft 16a is sealed by the two seal members 20. As shown in FIG. 3, the seal member 20 includes a seal main body 30 which is attached to the inner periphery surface 15a of the fifth arm member 15, and a protection cover 40 which is attached to the seal main body 30.

The seal main body 30 includes a metal ring 31 which is made of a known metal, such as iron and the like, and a seal lip 32 which is provided on the metal ring 31 by vulcanization bonding. As shown in FIG. 3, the metal ring 31 includes a first portion 31a having a cylindrical shape. A fitting outer-periphery portion 33 is formed on an outer-periphery surface of the first portion 31a by vulcanization bonding. The seal lip 32 and the fitting outer-periphery portion 33 are made of a material having rubber-like elasticity, and the material having the rubber-like elasticity is a known rubber, silicone, and the like. In accordance with the usage, it is preferable that the material having the rubber-like elasticity has oil proof property, chemical proof property, and the like. There is also a case where the fitting outer-periphery portion 33 is not provided, in accordance with a required specification. In this case, the metal ring 31 is fitted into the inner periphery surface 15a.

Before the metal ring 31 is fitted into the inner periphery surface 15a of the fifth arm member 15, an outer diameter of the fitting outer-periphery portion 33 is a little larger than the inner periphery surface 15a. Therefore, by fitting the fitting outer-periphery portion 33 into the inner periphery surface 15a, the seal main body 30 is attached to the inner peripheral surface 15a of the fifth arm member 15.

As shown in FIG. 3, a bent portion 31d is formed on one end portion of the metal ring 31 in an axial direction. The bent portion 31d is formed by bending the one end portion of the first portion 31a of the metal ring 31 in the axial direction radially inward. Also, in this embodiment, a side on which the bent portion 31d is provided in the metal ring 31 is referred to as a proximal end portion, and a side opposite to the bent portion 31d in the metal ring 31 is referred to as a distal end portion. And, the axial direction of the metal ring 31 and the axial direction of the seal main body 30 are corresponding with each other, and these axial directions may simply be referred to as axial direction. Further, as shown in FIG. 3, the right side of the page is referred to as one side in the axial direction, and the left side of the page is referred to as the other side in the axial direction. That is to say, the first portion 31a of the metal ring 31 extends toward the other side in the axial direction from the bent portion 31d.

The metal ring 31 has a second portion 31b which extends in the one side in the axial direction from the other side of the first portion 31a in the axial direction. The second portion 31b has a substantially cylindrical shape. In this embodiment, the diameter of the second portion 31b is gradually reduced toward the one side from the other side in the axial direction. Note that the other end of the first portion 31a in the axial direction is placed at a side of the distal end portion of the metal ring 31 relative to the bent portion 31d.

The metal ring 31 has a third portion 31c which extends radially inward from a distal end portion side in the second portion 31b. In one example, the third portion 31c has a substantially disk shape. The seal lip 32 extends radially inward or toward the other side in the axial direction from the third portion 31c of the metal ring 31. The inner periphery surface of the seal lip 32 is provided with a main lip 32a, and a dust lip 32b which is provided at the one side in the axial direction relative to the main lip 32a. A plural number of the main lips 32a and the dust lips 32b may be provided.

A ring-shaped spring 32c is wound around the outer-periphery surface of the main lip 32a. Therefore, the main lip 32 is stably brought into contact with the shaft 16a by the ring-shaped spring 32. The dust lip 32b also comes into contact with the shaft 16a. Note that, in this embodiment, the seal lip 32 and the fitting outer-periphery portion 33 are integrally formed.

The protection cover 40 is made of metal, such as iron, aluminum, and the like, and in this embodiment, the protection cover 40 has a disk shape. An outer diameter of the protection cover 40 is same as or slightly smaller than the inner diameter of the first portion 31a. A through hole 41 is formed at a center of the protection cover 40, and an inner diameter of the through hole 41 is a little larger than the outer diameter of the shaft 16a.

Figure 4:
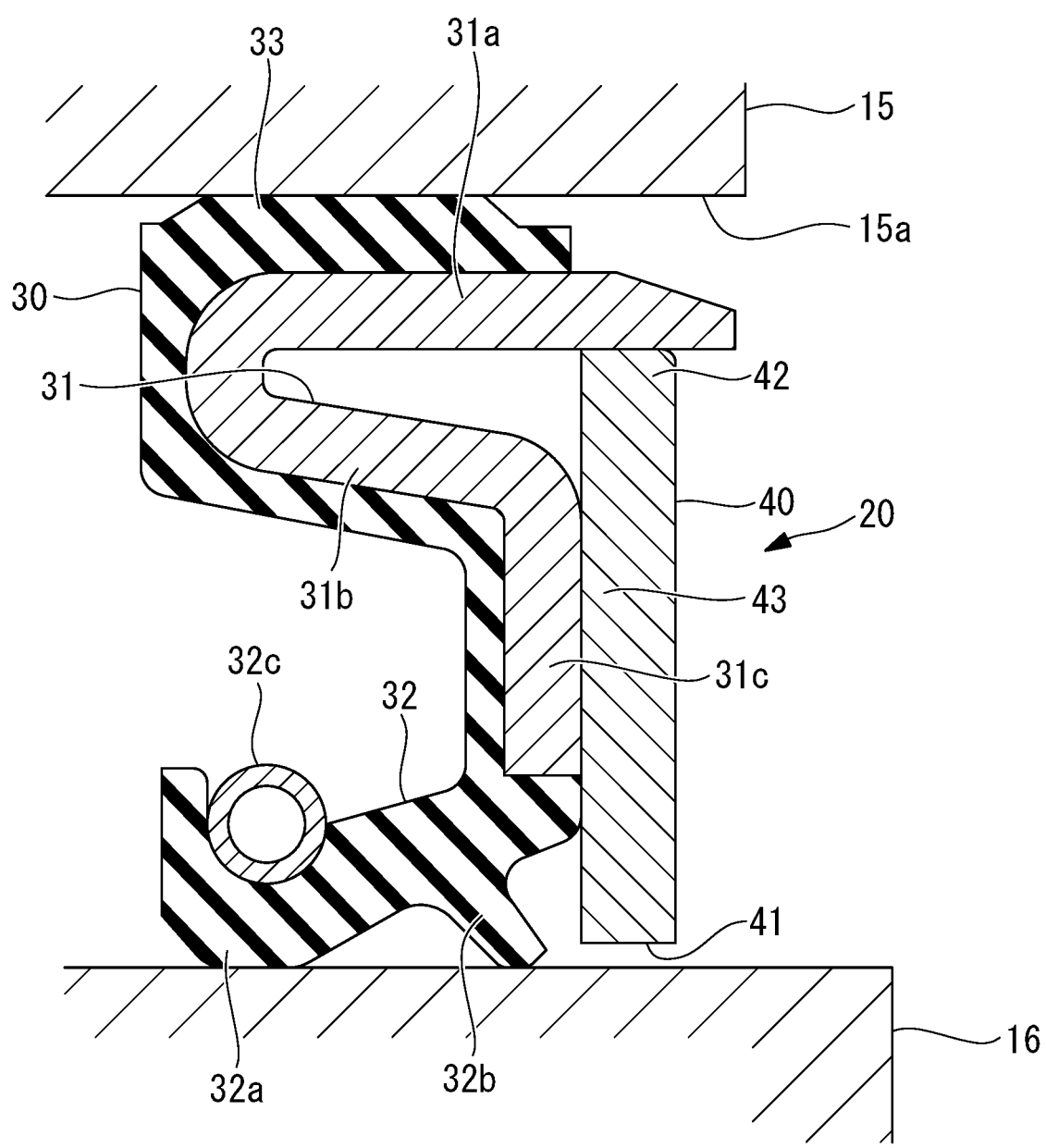
FIG. 4 is a sectional view of the seal member of this embodiment before forming a bent portion.

After the protection cover 40 is placed inside the first portion 31a of the metal ring 31 as shown in FIG. 4, the bent portion 31d is formed on the one end portion of the first portion 31a in the axial direction in the above described manner as shown in FIG. 3. By this, the protection cover 40 is fixed to the seal main body 30. Also, as shown in FIG. 4, thickness of the one end portion of the first portion 31a in the axial direction before the bent portion 31d is formed to become gradually thinner toward the end portion. Also, the outer diameter of the one end portion in the axial direction becomes gradually smaller toward the end portion. Therefore, the bent portion 31d is easily and certainly formed.

When the protection cover 40 is fixed to the seal main body 30 in the above described manner, the bent portion 31d comes into contact with an outer-periphery portion 42 of the protection cover 40 from the one side in the axial direction. Also, a part 43 in the protection cover 40, which is located at a radial inside relative to the outer-periphery portion 42, comes into contact with the second portion 31b or the third portion 31c of the metal ring 31 of the seal main body 30 from the one side in the axial direction.

In this embodiment, the protection cover 40 is fixed to the seal member 20. Also, the bent portion 31d which is provided on the metal ring 31 of the seal main body 30 comes into contact with the outer-periphery portion 42 of the protection cover 40 from the one side in the axial direction. And, the second portion 31b or the third portion 31c of the metal ring 31 of the seal main body 30 comes into contact with the part 43 in the protection cover 40, which is located at a radial inside than the outer-periphery portion 42, from the other side in the axial direction. For that reason, the protection cover 40 is firmly fixed to the seal main body 30, which prevents cleaning liquid from entering into seal space over a long period of time at the time of high pressure washing.

For example, as required in IP69K standard, when the cleaning liquid from the flat jet nozzle strikes the seal member 20, large force is applied to the protection cover 40. The protection cover 40 is typically made of a thin metal plate, however, two portions thereof, which are the outer-periphery portion 42 and the part 43, are supported by the seal main body 30, which stably prevents the cleaning liquid from entering into the seal space over a long period of time at the time of the high pressure washing.

Furthermore, in this embodiment, the protection cover 40 is fixed to the seal member 20. Therefore, it is possible to perform attachment operation of the seal member 20 to the fifth arm member 15 easily in comparison with a case where a protection cover, which is separated from the seal main body 30, is provided for preventing the cleaning liquid from entering into the seal space at the time of the high pressure washing. And, distance between the protection cover 40 and the seal lip 32 of the seal main body 30 in the axial direction can be constant without being affected by degree of skill in the attachment operation of users. This is advantageous for ensuring a function of the seal member 20.

There is a case where a film, a layer, a protrusion, or the like, made of a material having rubber-like elasticity, is provided on a protection cover 40 side surface of the third portion 31c of the metal ring 31 of the seal main body 30. In this case also, the same effect as that described above can be obtained.

Moreover, in this embodiment, the bent portion 31d is formed by bending the end portion of the first portion 31a of the metal ring 31 radially inward. For that reason, the outer diameter of the seal member 20 is not enlarged as a result of the formation of the bent portion 31d. This is advantageous for downsizing the seal member 20.

And, in this embodiment, the metal ring 31 includes the first portion 31a which extends in the other side in the axial direction from the bent portion 31d, and the second portion 31b which extends toward the one side in the axial direction from the first portion 31a and which forms a distal end side relative to the first portion 31a in the metal ring 31. Also, the second portion 31b or the third portion 31c of the metal ring 31 comes into contact with the part 43 of the protection cover 40 in the axial direction.

That is to say, the first portion 31a which is for attaching the seal member 20 to the fifth arm member 15, and the second portion 31b and the third portion 31c which come into contact with the protection cover 40 are realized by the single metal ring 31. This configuration contributes to reduction in the number of parts and in manufacturing costs. Also, the seal lip 32 is provided at the distal end portion side of the metal ring 31. This configuration also contributes to the reduction in the number of parts and in the manufacturing costs.

Furthermore, in this embodiment, the seal lip 32 comes into contact with the outer-periphery surface of the shaft 16a, and a ring-shaped spring 32c for pushing the seal lip 32 toward the outer-periphery surface of the shaft 16a is provided on the seal lip 32. Therefore, it certainly prevents the cleaning liquid form entering into the seal space at the time of the high pressure washing, and also, it suitably prevents oil and fat from leaking from the inside.

A seal member 20 according to a second embodiment will be described below with reference to the accompanying drawings. The seal member 20 of the second embodiment is also attached at the same position of the same robot R as those in the first embodiment. In this embodiment, the same reference signs are assigned to the configurations which are the same as or similar to those in the first embodiment, and explanations thereof will be omitted.

Figure 5:
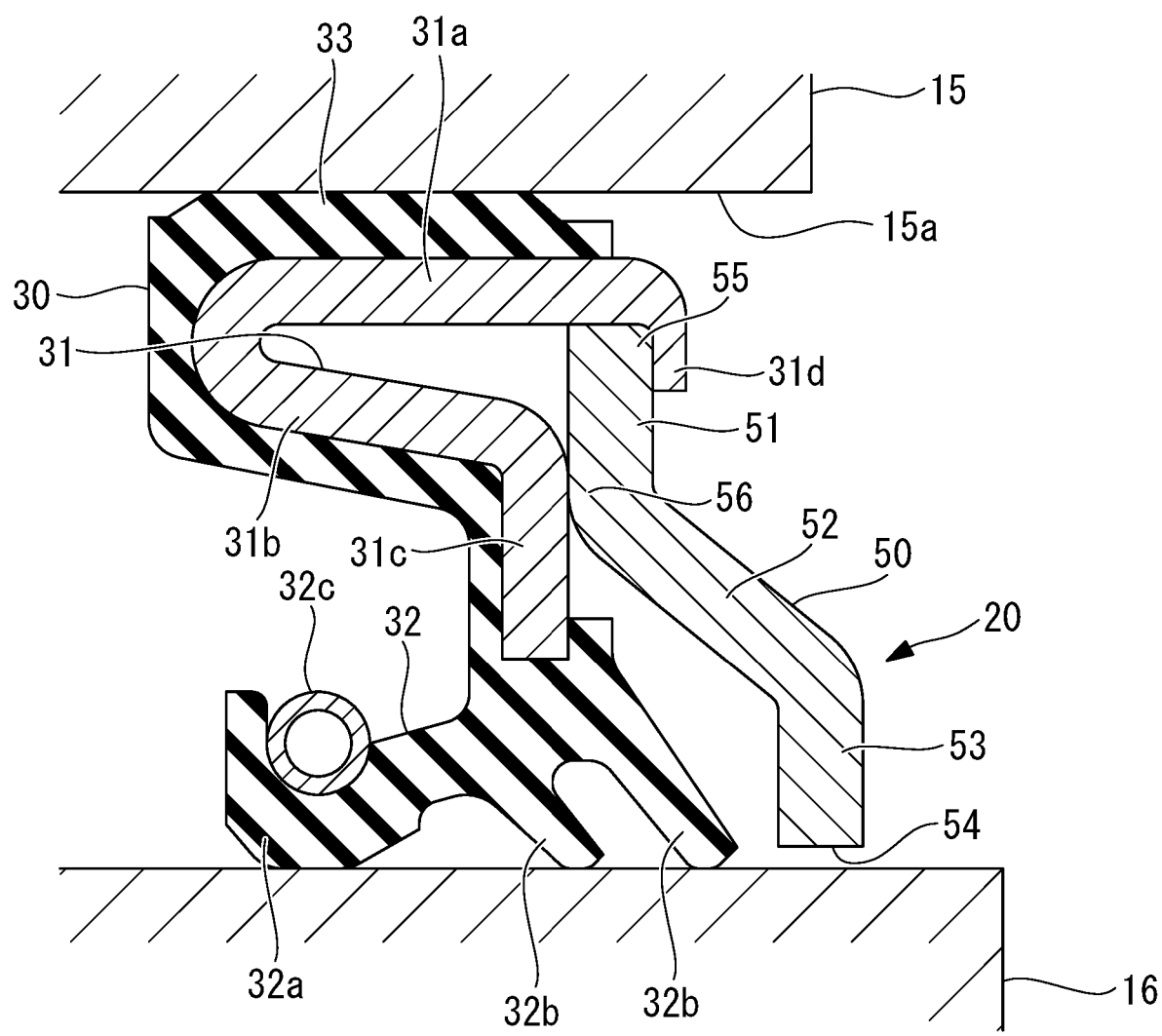
FIG. 5 is a sectional view of a seal member according to a second embodiment of the present invention.

As shown in FIG. 5, a protection cover 50 having a different shape from the protection cover 40 of the first embodiment is provided on the seal member 20 of the second embodiment. Also, only one dust lip 32b is provided in the first embodiment, however, a plurality of the dust lips 32b are provided in the seal lip 32 of the seal member 20 of the second embodiment.

The protection cover 50 is made of metal, such as iron, aluminum, and the like, and has a substantially disk shape. The protection cover 50 includes a first flat portion 51 which extends radially inward from an outer-periphery portion thereof, and an extension part 52 which extends toward the one side in the axial direction from the radial inside of the first flat portion 51. The diameter of the extension portion 52 is gradually reduced toward the one side in the axial direction. The protection cover 50 has a second flat portion 53 which extends radially inward from the radial inside of the extension portion 52. Moreover, there also is a case where the second flat portion 53 is not provided.

An outer diameter of the first flat portion 51 of the protection cover 50 is same as an inner diameter of the first flat portion 31a of the metal ring 31, or slightly smaller than the inner diameter of the first portion 31a. A through hole 54 is formed at a center of the protection cover 50, and an inner diameter of the through hole 54 is a little bigger than the outer diameter of the shaft 16a.

Similar to the first embodiment, after placing the protection cover 50 inside the first portion 31a of the metal ring 31, the bent portion 31d is formed on the one end portion of the first portion 31a in the axial direction, as shown in FIG. 5. By this, the protection cover 50 is fixed to the seal main body 30.

When the protection cover 50 is fixed to the seal main body 30 as described above, the bent portion 31d comes into contact with an outer-periphery portion 55 of the protection cover 50 from the one side in the axial direction. And, the second portion 31b or the third portion 31c of the metal ring 31 of the seal main body 30 comes into contact with a part 56, which is located at a radial inside relative to the outer-periphery portion 55 in the protection cover 50, from the other side in the axial direction. In the second embodiment, the part 56 is provided in the first flat portion 51, however, the part 56 may also be provided in the extension portion 52, and the like.

In the second embodiment also, the protection cover 50 is fixed to the seal member 20. And, the bent portion 31d, which is provided on the metal ring 31 of the seal main body 30, comes into contact with the outer-periphery portion 55 of the protection cover 50 from the one side in the axial direction. Further, the second portion 31b or the third portion 31c of the metal ring 31 of the seal main body 30 comes into contact with the part 56 which is located at a radial inside relative to the outer-periphery portion 55 in the protection cover 50 from the other side in the axial direction. Therefore, the protection cover 50 is firmly fixed to the seal main body 30, which stably prevents the cleaning liquid from entering into the seal space over a long period of time at the time of the high pressure washing in the same manner as in the first embodiment.

Moreover, in the second embodiment, the protection cover 50 is provided with a first flat portion 51, which extends radially inward from the outer-periphery portion 55 of the protection cover 50, and an extension portion 52, which extends toward the one side in the axial direction from the radial inside of the first flat portion 51. Therefore, due to the extension portion 52, space for the seal lip 32 which is provided within the seal member 20 becomes wider. With this configuration, for example, it is possible to provide a plurality of dust lips 32b in the seal lip 32, and the like.

Figure 6:
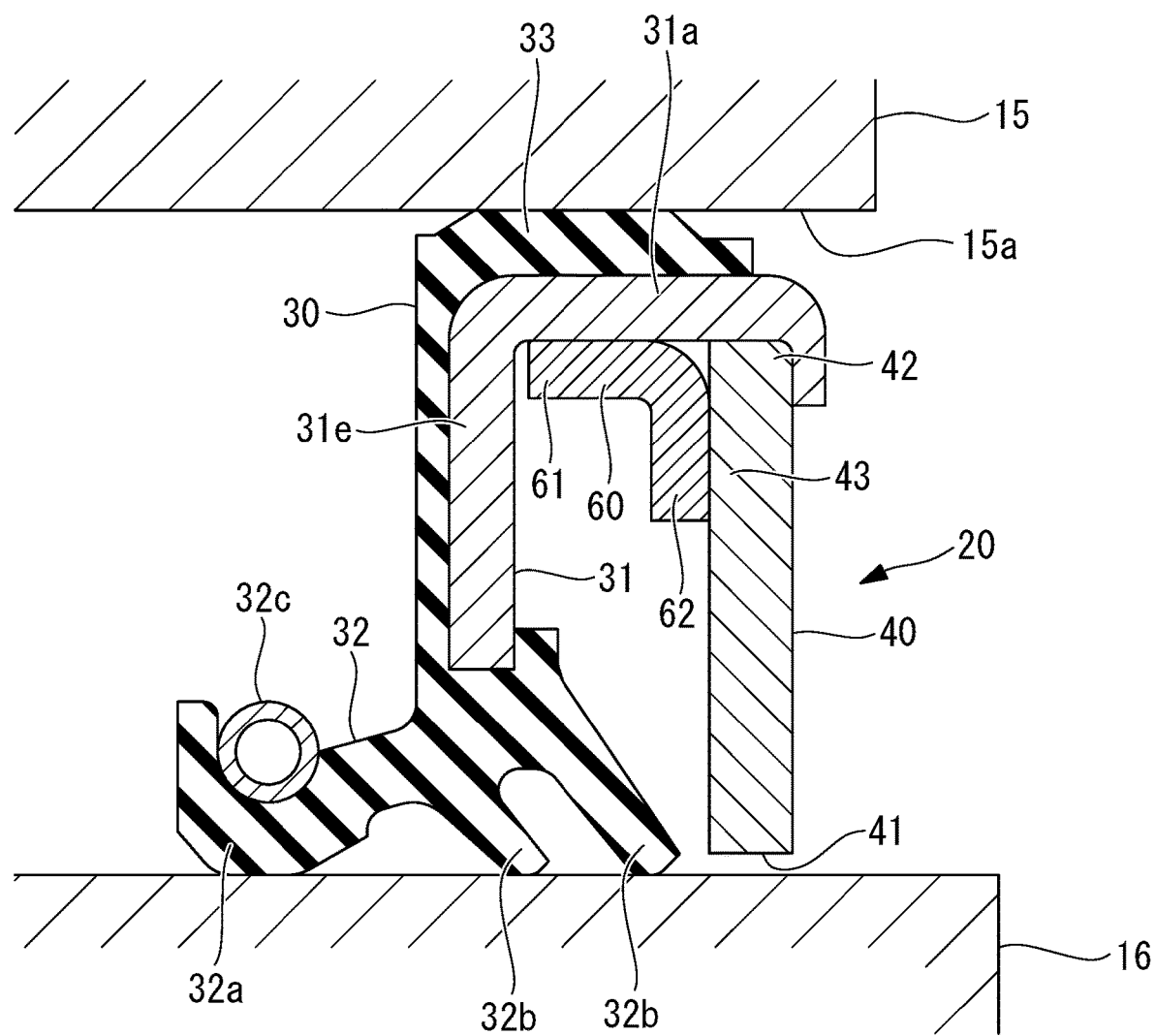
FIG. 6 is a sectional view of a seal member according to a first modified example of the present embodiment.

Also, in the above described embodiments, a metal ring member 60 which comes into contact with the parts 43, 56 of the protection covers 40, 50 in the axial direction may be provided separately. For example, as shown in FIG. 6, the ring member 60 is fixed to the inner periphery surface of the first portion 31a of the metal ring 31 by fitting, welding, and the like. And, when the protection cover 40 is fixed to the seal main body 30 in the above described manner, the bent portion 31d comes into contact with the outer-periphery portion 42 of the protection cover 40 from the one side in the axial direction. Also, the ring member 60 which is fixed to the seal main body 30 comes into contact with the part 43 of the protection cover 40 from the other side in the axial direction.

In the modified example, the second portion 31b and the third portion 31c are not provided in the metal ring 31, however, a second portion 31e which extends radially inward is provided instead. And, the seal lip 32 is provided on a radial inside of the second portion 31e. In one example, the ring member 60 includes, a cylindrical portion 61 which is fixed to the inner periphery surface of the first portion 31a of the metal ring 31, and a radial direction extension portion 62 which extends radially inward from one end of the cylindrical portion 61.

Figure 7:
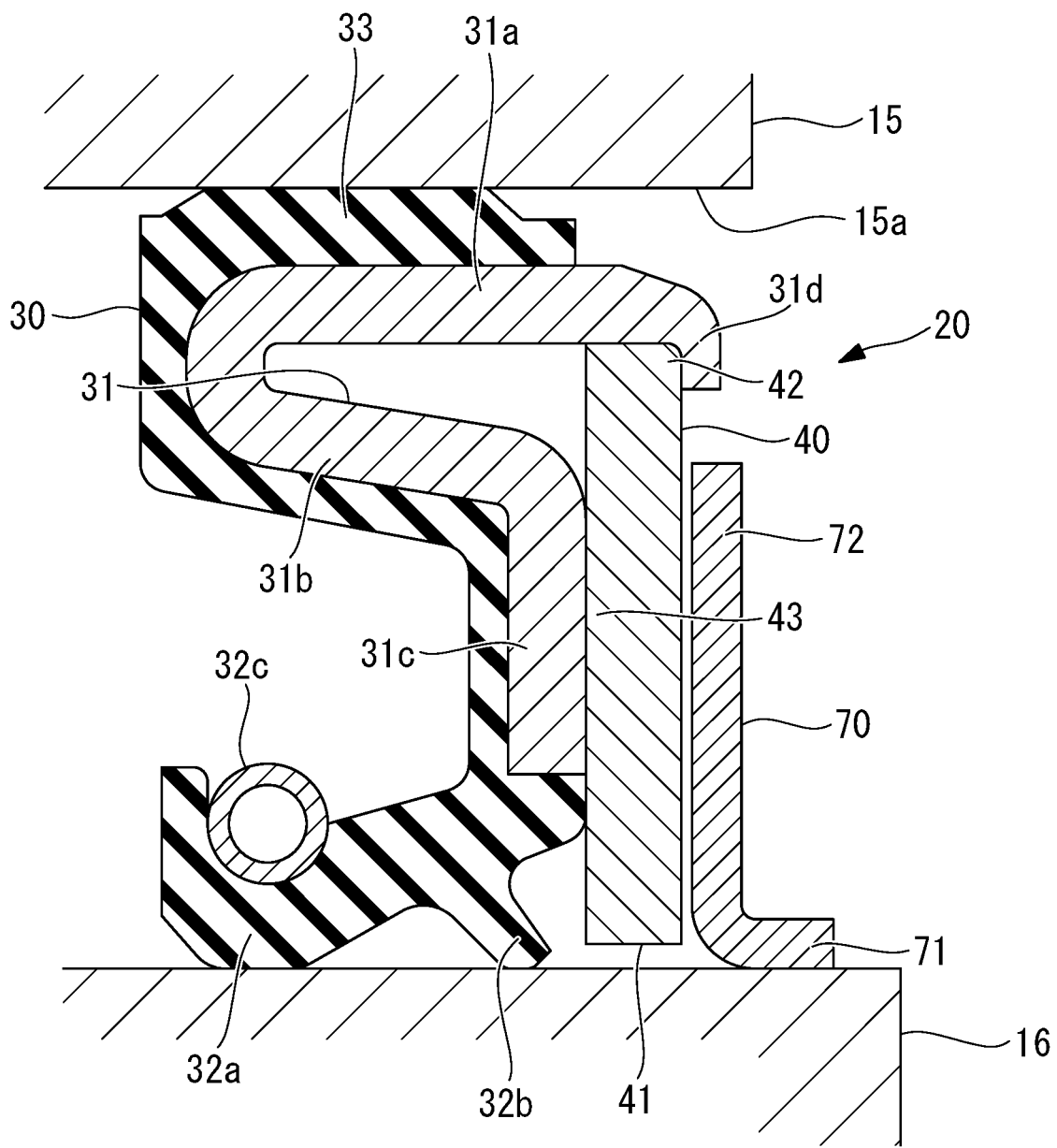
FIG. 7 is a sectional view of a seal member according to a second modified example of the present embodiment.

Also, in each of the above described embodiments, an additional protection cover 70 may be fixed to the shaft 16a. For example, as shown in FIG. 7, the additional protection cover 70 includes a cylindrical portion 71 which is fixed to the outer-periphery surface of the shaft 16a by fitting, welding, and the like, and the radial direction extension portion 72 which extends radially outward from the one end of the cylindrical portion 71. The radial direction extension portion 72 faces the protection cover 40 in the axial direction, and a slight gap is made between the radial direction extension portion 72 and the protection cover 40.

Figure 8:
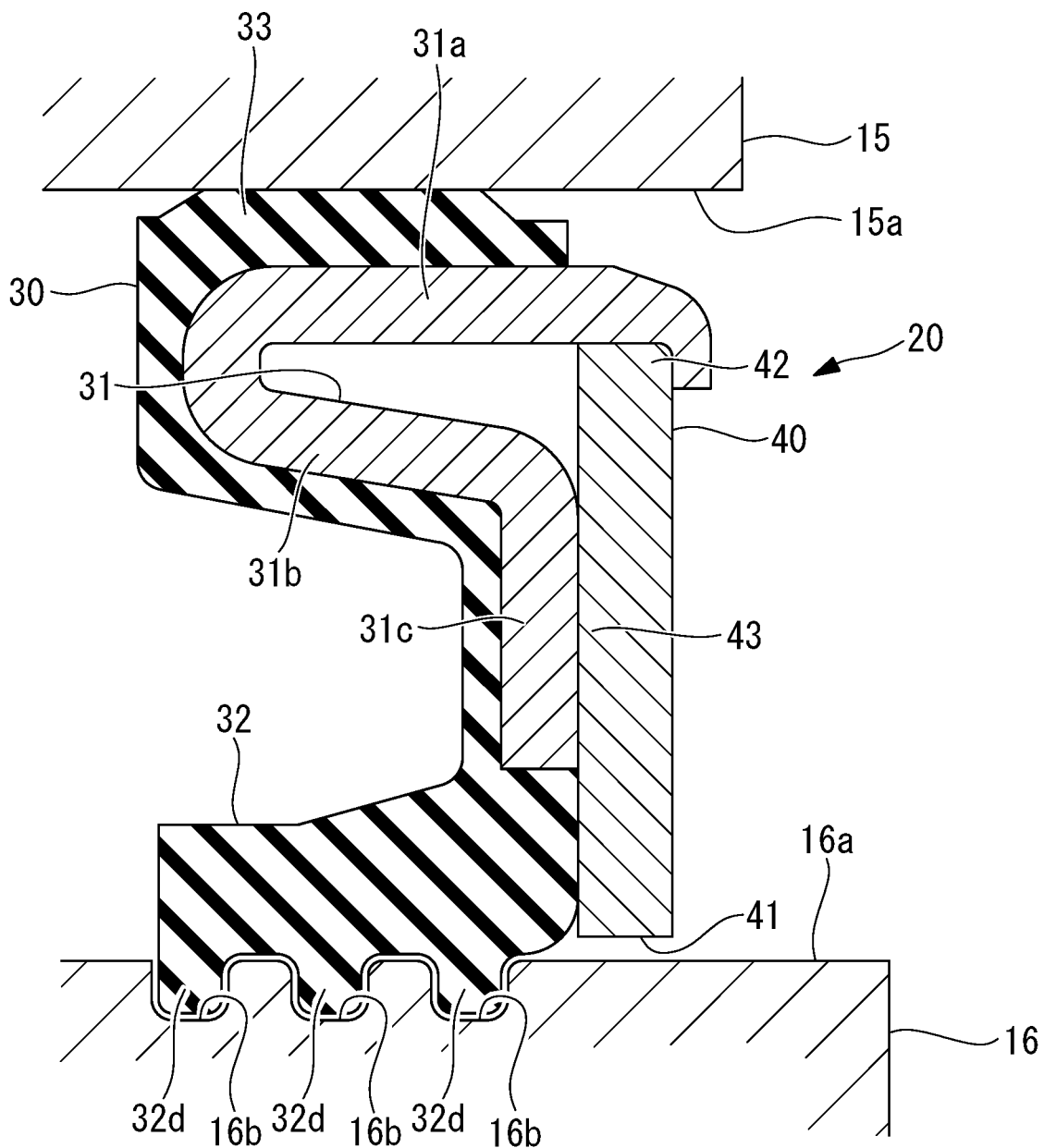
FIG. 8 is a sectional view of a seal member according to a third modified example of the present embodiment.

Further, in each of the above described embodiments, the seal lip 32 may have other function. For example, as shown in FIG. 8, a plurality of lips 32d may be provided at the radial inside of the seal lip 32, instead of the main lip 32a and the dust lip 32b, and the plurality of lips 32d may respectively be placed within a plurality of grooves 16b which are formed on the outer-periphery surface of the shaft 16a. In this case, together with the plurality of grooves 16b, the plurality of lips 32d form a labyrinth seal, which is a non-contact seal.

Also, in the above described embodiments, the seal member 20 is provided between the fifth arm member 15 and the sixth arm member 16, however, the seal member 20 may be provided at the other portion of the robot R. For example, the seal member 20 may be provided between the first arm member 11 and the second arm member 12, and the like.

Moreover, in each of the above described embodiments, the seal main body 30 may be attached to the shaft 16a. In this case, the first portion 31a of the metal ring 31 is provided so as to be fitted into the shaft 16a. Also, the second portion 31b extends radially outwardly from the other end portion of the first portion 31a in a diagonal manner, and the third portion 31c extends radially outwardly from the second portion 31b. And, the bent portion 31d comes into contact with the inner periphery portion of the protection covers 40, 50 in the axial direction. The second portion 31b or the third portion 31c come into contact with the parts 43, 56 of the protection covers 40, 50 in the axial direction, and the parts 43, 56 are at more radially outward side than the inner periphery portions of the protection covers 40, 50.

The invention claimed is:

1. A seal member interposed between a first member as a rotatable body and a second member having an inner periphery surface opposed to an outer-periphery surface of the first member, the seal member comprising:
   a seal main body attached to one of the first member and the second member; and,
   a protection cover attached to the seal main body, wherein,
   the seal main body includes a seal lip which comes into contact with, or which is close to, the other one of the first member and the second member,
   a bent portion formed on one end, in an axial direction of the seal main body, of a metal ring of the seal main body is in contact with an outer-periphery portion of the protection cover in the axial direction of the seal main body, and
   the seal main body is in contact with a part of the protection cover in the axial direction, and the part of the protection cover is located at a radial inside relative to the outer-periphery portion of the protection cover,
   wherein a shape of a cross section of the protection cover is straight toward a radial direction without being bent.

2. The seal member according to claim 1, wherein the bent portion is formed by bending the metal ring of the seal main body radially inward.

3. The seal member according to claim 1, wherein the metal ring of the seal main body is in contact with the part in the protection cover in the axial direction.

4. The seal member according to claim 1, further comprising a ring member made of metal and fitted into an inner periphery surface of the metal ring, wherein
   the ring member in the seal member is in contact with the part of the protection cover in the axial direction.

5. The seal member according to claim 1, wherein the bent portion of the seal main body is in contact with the outer-periphery portion of the protection cover from a first side in the axial direction, and
   the seal main body is in contact with the part in the protection cover from a second side in the axial direction.

6. The seal member according to claim 5, wherein, in a case where a bent portion side in the metal ring is a proximal end side and a side opposite to the bent portion in the metal ring is a distal end side, the metal ring comprises a first portion which extends toward the second side in the axial direction from the bent portion, and a second portion which constitutes a side of a distal end portion in the metal ring relative to the first portion, and which extends, from the first portion, toward the first side in the axial direction, and
   the second portion of the metal ring or the side of the distal end portion in the metal ring relative to the second portion is in contact with the part of the protection cover.

7. The seal member according to claim 1, wherein the seal lip is in contact with an outer-periphery surface of the first member, and
   a ring-shaped spring is provided on the seal lip so that the seal lip is pressed toward the outer-periphery surface of the first member.

8. A robot comprising: a seal member interposed between a first member as a rotatable body and a second member having an inner periphery surface opposed to an outer-periphery surface of the first member, the seal member comprising:

a seal main body attached to one of the first member and the second member; and, a protection cover attached to the seal main body, wherein, the seal main body includes a seal lip which comes into contact with, or which is close to, the other one of the first member and the second member, a bent portion formed on one end, in an axial direction of the seal main body, of a metal ring of the seal main body is in contact with an outer-periphery portion of the protection cover in the axial direction of the seal main body, and the seal main body is in contact with a part of the protection cover in the axial direction, and the part of the protection cover is located at a radial inside relative to the outer-periphery portion of the protection cover, wherein a cross section shape of the protection cover is straight toward a radial direction without being bent.

* * * * *